United States Patent

[11] 3,579,108

[72] Inventor Cassius C. Cutler
Holmdel, N.J.
[21] Appl. No. 779,859
[22] Filed Nov. 29, 1968
[45] Patented May 18, 1971
[73] Assignee Bell Telephone Laboratories Incorporated
Murray Hill, Berkeley Heights, N.J.

[54] DIFFERENTIAL CODER AND DECODER
22 Claims, 3 Drawing Figs.

[52] U.S. Cl. .......... 325/38, 179/15, 325/42
[51] Int. Cl. .......... H04b 1/02, H04b 1/06
[50] Field of Search .......... 325/38, 38.1, 41, 42, 141, 321, 323; 178/68, 6; 179/15 (A), 15 (APC), 15 (ACE), 15 (AEC); 332/11 (D)

[56] References Cited
UNITED STATES PATENTS
3,383,461 5/1968 Dryden .......... 178/6

*Primary Examiner*—Robert L. Richardson
*Attorneys*—R. J. Guenther and E. W. Adams, Jr.

ABSTRACT: A differential coding system is proposed which, when the slope of the message signal to be coded is large, accelerates the production of the output of a quantizer which is used to encode the message signal. A digital coder and elastic store are interposed between the quantizer and transmission line to insure that the digitally coded signal is transmitted at a desired line rate while the production of those digital signals may be significantly greater than the line rate. A decoder is utilized at the receiver which functions in the inverse manner and enables the coded message signal to be decoded.

INVENTOR
C. C. CUTLER
BY David P. Kelley
ATTORNEY

DIFFERENTIAL CODER AND DECODER

BACKGROUND OF THE INVENTION

This invention relates to a digital transmission system and, in particular, to differential encoding and decoding schemes.

In a system employing the most primitive form of differential pulse code modulation, the message waveform to be transmitted is sampled at a predetermined rate, and positive and negative step signals are applied to integrating circuits at both transmitter and receiver at the sampling rate. In the encoder at the transmitter, the output of the integrator is compared with the instantaneous amplitude of the message waveform and the result of the comparison is used to determine the polarity and magnitude of the next step signal. The next step signal is positive, causing the integrator output to rise, if the integrator output is smaller than the message waveform, and is negative, permitting the integrator output to fall if the integrator output is larger than the message waveform. A series of binary digits is produced by a coder which receives the step signal and is transmitted to the receiver each time the step signal is positive in the differential pulse code modulator and another series is produced and transmitted each time the step signal is negative. In the decoder at the receiver, the incoming binary digits control the polarity and magnitude of the locally generated step signals and the original message waveform is reproduced by an integrator and low-pass filter.

Important factors tending to detract from transmission quality in a differential pulse code modulation system include quantizing noise and overload distortion. Quantizing noise is caused by step signals which are not and cannot be infinitesimally small and can be particularly bothersome under idle circuit conditions when the amplitude of the transmitted message waveform is small. Overload distortion occurs when the step signal is not large enough at the integrator output to follow rapid changes in the instantaneous amplitude of the message waveform and can be a major annoyance whenever it occurs.

This dilemma has been resolved in the prior art by the introduction of an appropriate form of companding into the differential pulse code modulation system. In this manner, the dynamic range of the message waveform is reduced by compression at the transmitter and restored by complementary expansion at the receiver. With its dynamic range reduced, the message waveform is less subject to either quantizing noise or overload distortion.

In the past, companding has normally been accomplished with the aid of variolosser networks which include nonlinear devices such as semiconductor diodes. Devices of this type tend to be rather expensive, however, and need to be carefully selected and matched if the desired amount of compression is to be secured and if the expansion at the receiver is to complement the compression at the transmitter with the necessary degree of accuracy.

Attempts have been made to eliminate the need for the variolosser network and these attempts include the technique of varying the step size applied to the integrator in the encoder in order to more accurately track the message signal sought to be encoded. For instance, S.J. Brolin Pat. applications Ser. Nos. 572,823, filed Aug. 16, 1966 now U.S. Pat. No. 3,461,244 and 674,943, filed Oct. 12, 1967 now U.S. Pat. No. 3,500,141 and assigned to the assignee of the present application, disclose companding systems in which a variable step size is chosen to be utilized at the encoder and decoder in order to achieve companding without the need for the expensive variolosser networks. However, an objection to the variable step size approach to companding is that as the step size selected is increased in magnitude, the amount of overshoot measured at the comparator may tend to be great and have deleterious effects upon the transmission system.

An object of the present invention is to provide a differential pulse code modulation transmission system in which both quantizing noise, overload distortion, and overshoot problems are minimized in the transmission system.

SUMMARY OF THE INVENTION

The present invention provides a type of compression at the transmitter and expansion at the receiver by sensing when the amplitude of the message signal is much greater than the output of the integrator. This sensing is accomplished by counting a predetermined number of the same digit occuring sequentially produced by a comparator and quantizer, and when the predetermined number is reached, increasing the sampling rate of the message signal so that the encoder can catch up to the amplitude of the message signal in a very short period of time. For instance, when a series of three binary "1's" is detected, the integrated quantizer output is not equal to or greater than the message signal. Rather than wait for a continued series of "1's" to be produced at the regular rate, a separate oscillator which operates at a much faster rate than the regular rate is activated and causes "1's" to be produced at the increased rate until the comparator and quantizer produce a binary "0." This feature enables the encoder of the present invention to utilize a smaller valued step function to provide the coding and thus obviate the significant overshoot problems and quantizing noise encountered in the prior art.

In accordance with another feature of the invention, an elastic store is utilized to convert the varying rate digital output of the comparator, quantizer and coder to a digital signal which can be uniformly gated at a required line rate for transmission to the decoder. An up/down counter is utilized to monitor the condition of the elastic store and to prevent it from either overflowing or depleting.

In accordance with another feature of the present invention, the decoder is instructed to use the same increased sampling rate in reforming the message signal in response to the digital signal received; that is, when a predetermined number of the same digit is received sequentially, the reconstruction portion of the decoder is caused to speed up in the same manner as in the encoder at the transmitter. In this manner, the quantizing noise problem of the prior art is remedied by using smaller valued step functions while the slope overload condition in differential pulse code modulation systems is remedied by increasing the rate of production of binary digits from the comparator, quantizer and decoder.

DETAILED DESCRIPTION

Figure 1:
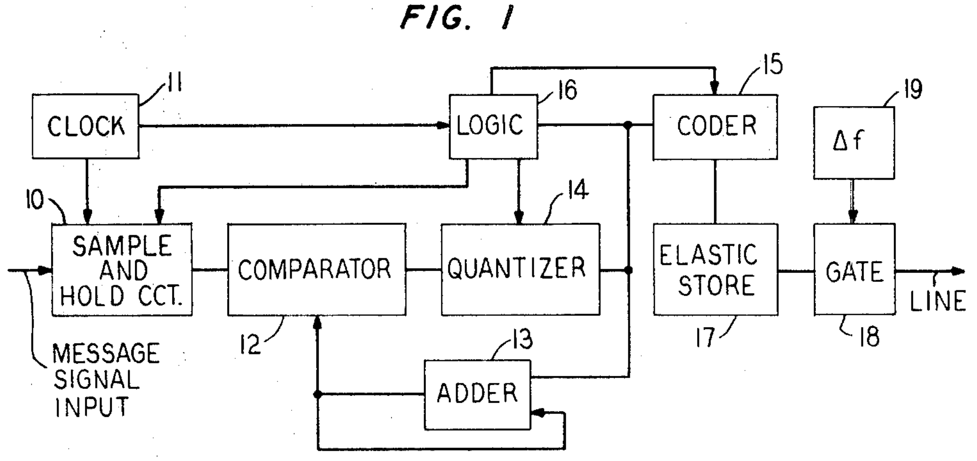
FIG. 1 is a block diagram of the encoder at the transmitter of a digital transmission system according to the present invention.

In the encoder of FIG. 1 the message signal to be encoded is applied to one input of three-input sample and hold circuit 10. The second input of sample and hold circuit 10 receives a clock signal emanating from a clock source 11 which operates the sample and hold circuit 10 at its rate. The output of sample and hold circuit 10 is supplied to one input of two-input comparator 12, the other input of which is supplied by the output of an adder which may comprise one or more stages of integration.

The output of comparator 12 is supplied to a quantizer, which is a well-known prior-art device and, for the purposes of the present invention, produces a quantized pulse output representative of the sample applied to it. The output of quantizer 14 is supplied to coder 15, the output of which is supplied to one input of two-input logic circuit 16 and to elastic store 17. Coder 15 produces a binary representation of the quantized sample applied to it at irregular times determined by logic circuit 16. The output of quantizer 14 is also supplied to adder circuit 13. The output of elastic store 17 is applied through gate 18 to the transmission line. Gate 18 is caused to operate by clock source 19 at a slightly higher rate than that of clock source 11. The frequency of clock source 19 may be the frequency of clock source 11 plus a subharmonic of the frequency output of source 11.

Logic circuit 16 monitors the state of elastic store 17 and prevents it from either overflowing or depleting. To this end, when the elastic store is filled, a rapid sampling condition is inhibited and when it is depleted, sample and hold circuit 10, quantizer 14, and coder 15 are caused to operate out of sequence by a signal supplied by logic circuit 16 to sample and hold circuit 10.

In operation, the message signal input is sampled and held under control of clock source 11 and applied to one input of two-input comparator 12. If the output of sample and hold circuit 10 is greater than the other input to comparator 12, which is the output of adder 13, comparator 12 produces a signal which causes coder 15 to produce a binary representation of the difference. As long as the output of sample and hold circuit 10 is greater than the output of adder 13, a series of numbers representing the maximum change in the positive direction will continue to be produced at the output of quantizer 14. For example, for a 1-bit code, a series of "1's" will be produced. On the other hand, if the output of sample and hold circuit 10 is less than that of adder 13, a series of numbers representing a maximum change in the negative direction will be produced, (i.e., a series of "0's," in case of a 1-bit delta modular code). The output of coder 15 is loaded into elastic store 17, a well-known prior-art device, which operates to shift incoming bits to the last stages and shifts all bits one stage when a readout occurs. The operation of the system will be described for a 1-bit code, but extension to a 2-, 3-, or 4-bit code is obvious, and from the point of view of reproduction quality, advantageous.

When coder 15 produces a predetermined number of sequential binary "1's" representing a maximum positive slope (for instance, a series of three "1's") logic circuit 16 will speed up the production of the output of quantizer 14 and coder 15 by causing an oscillator operating at a much faster rate than that of clock source 11. This faster clock source causes quantizer 14 to rapidly present its output to coder 15 which produces binary "1's" until the polarity output of comparator 12 is caused to change, i.e., until the output of adder 13 is greater than the output of sample and hold circuit 10. Without this feature, the encoder shown in FIG. 1 would suffer greatly from slope overload because for a rapid change in the magnitude of the message signal input, the encoder would take a very long time to catch up, thus causing significant slope overload. (For a multilevel, multibit code, a single sample of maximum value might be used as a signal to increase the sampling rate.)

Quantizer 14 may be designed to produce a single-valued step which minimizes quantizing noise and overshoot problems found in prior-art encoders. In that case, the output of quantizer 14 is supplied directly to elastic store 17, the output of which is supplied to gate 18. In either case, the rate of production of the binary digits by the quantizer 14 may be greater than the rate of clock 11 and the average effective rate of binary digits supplied to elastic store 17 will also be greater than the rate of clock source 11. Therefore, a slightly higher gating signal rate supplied by source 19 is used to gate the output of elastic store 17 onto the transmission line for transmission to the remotely located receiver.

As another feature of the present invention, logic circuit 16 monitors the state of elastic store 17, preventing it from depleting or overflowing. An overflow condition may occur when the speeded-up production of binary bits from the output of quantizer 14 and coder 15 under control of logic circuit 16 causes a larger number of binary digits to be generated at a much faster rate than the digits are extracted from elastic store 17 under control of oscillator 19 through circuit 18. This condition is undesirable and, by use of an up/down counter and associated logic circuitry in logic circuit 16, when elastic store 17 is filled, the production of binary digits from quantizer 14 and coder 15 is inhibited. Elastic store 17 may also become depleted since the clock rate of oscillator 19 is greater than the clock rate of oscillator 11. When the sequence of binary digits which causes logic circuit 16 to increase the output rate of quantizer 14 and coder 15 does not occur, the depletion condition may exist. The rate of production of binary digits from quantizer 14 under control of clock source 11 will be less than the rate at which they are gated out of elastic store 17. This depletion condition is prevented from occurring under control of logic circuit 16 since the up/down counter located therein which monitors the state of elastic store 17, causes an extra sample to occur in sample and hold circuit 10 when the state of elastic store 17 approaches its depletion condition. This causes extra binary digits to be generated in quantizer 14 and coder 15 supplied to elastic store 17, thus preventing its depletion.

The present invention has been shown with a simple differential pulse code modulation encoder and, specifically, a delta modulator, but it could be used with other coders, such as an error feedback coder where slope overload is a problem.

Figure 2:
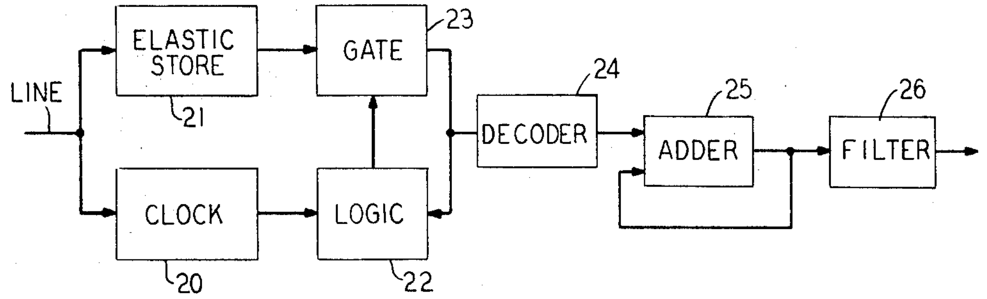
FIG. 2 is a block diagram of the decoder at the receiver for use with the coder of FIG. 1.

FIG. 2 is a block diagram of a differential decoder which may be used at the receiver to recover the message signal encoded by the arrangement shown in FIG. 1. The binary information is received at the uniform line rate and is used to synchronize clock 20 with clock 11 in the transmitter by employing the subharmonic utilized in the clock rate of source 19 in the transmitter. The binary information is also supplied to the input of elastic store 21. The output of clock 20 is supplied to logic circuit 22, the output of which is used to gate the output of elastic store 21 through gate circuit 23 to decoder 24 which converts the binary coded signal to a simple quantized signal. The output of the decoder is supplied to adder 25. Adder 25 may include any number of integrated stages desired and its output is passed through filter 26 to reconstruct the message signal. When a predetermined number of "1's" or "0'a" (or codes representing maximum or minimum signal changes in case of a multilevel code) are produced at the output of gate circuit 23, the accelerated gating rate is again employed by logic circuit 22 to increase the rate at which the output of elastic store 21 is supplied to the input of coder 24 through gate circuit 23. In the encoder shown in FIG. 1 provision was made in logic circuit 16 to prevent elastic store 17 from overflowing or depleting. The complementary provision is made in the receiver shown in FIG. 2 in logic circuit 22 since the receiver must "know" the information carried by the received binary digital train. For instance, when the extra sample is utilized in the transmitter to prevent a depleted condition, this information must be known by the receiver to provide the complementary action required at the receiver.

The decoder illustrated in FIG. 2 serves not only to decode the received message digits and convert them to the original message waveform, but also provides expansion which is complementary to the compression performed at the transmitting terminal in the associated encoder shown in FIG. 1.

Figure 3:
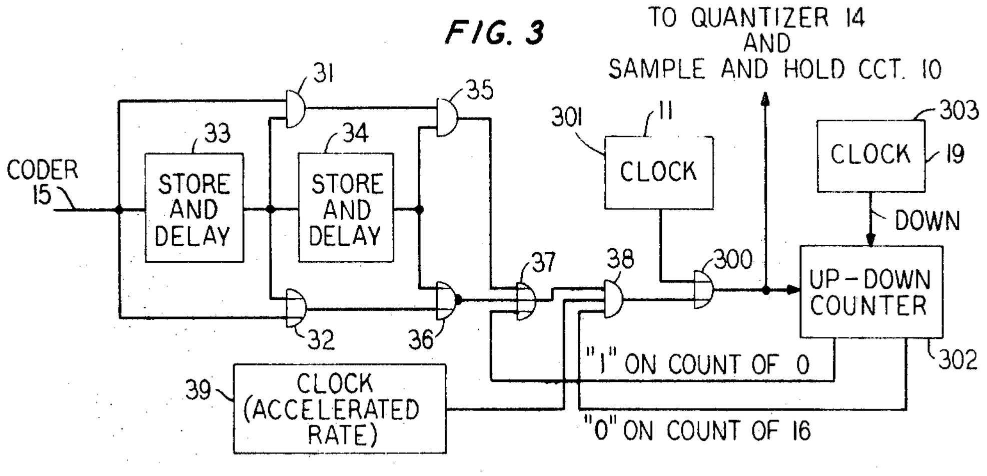
FIG. 3 is a logic diagram of a logic circuit which may be utilized with the encoder of FIG. 1 to determine when the increased sampling rate should be utilized and the condition of the elastic store.

FIG. 3 is a block logic diagram of logic circuit 16 utilized in the encoder shown in FIG. 1. As described above, its function is to detect when a predetermined number of "1's" or "0's" are generated, to cause quantizer 14 to increase its output rate and coder 15 to increase the rate of production of "1's" or "0'a" when the predetermined number is detected, and to prevent elastic store 17 from depleting or overflowing. Standard logic symbols are utilized in FIG. 3 to illustrate the functions of the described logic blocks.

The output of coder 15 is applied to one input of two-input AND gate 31, to one input of two-input OR gate 32, and to store and delay circuit 33, which essentially is a 1-bit delay circuit. The output of store and delay circuit 33 is applied to the second input of two-input AND gate 31, to the second input of two-input OR gate 32, and to store and delay circuit 34. Thus, the binary digit stored in store and delay circuit 33 will be applied to AND gate 31 and OR gate 32 and to store and delay circuit 34. When the next binary digit is supplied by quantizer 14, the binary digit in store and delay circuit 33 is shifted to store and delay circuit 34 which operates in the same manner as store and delay circuit 33 while the new digit is now stored in store and delay circuit 33.

The output of AND gate 31 is applied to one input of two-input AND gate 35 and the output of OR gate 32 is supplied to one input of two-input NOR gate 36. The output of store and delay circuit 34 is applied to the second input of AND gate 35 and to the second input of NOR gate 36. The output of AND gate 35 is supplied to one input of three-input OR gate 37, while the output of NOR gate 36 is supplied as a second input to three-input OR gate 37. For the present, the operation of the logic diagram so far discussed will be set forth without referring to the third input to OR gate 37. In case of a two or more digit (four or more level) differential coding system, this circuit would be reproduced for each digit, and the number of inputs to OR gate 37 increased appropriately.

The logic circuitry described thus far operates to detect when three "1's" or three "0's" are generated in sequence. When three "1's" are generated in sequence, the inputs to AND gate 31 will be "1's" and its output will be a "1" which is supplied as one input to two-input AND gate 35. The output of store and delay circuit 34 is also a "1" because the series of three binary "1's" was applied by coder 15. The output of AND gate 35 will be a "1" since both of its inputs are "1's" and will be applied to the input of three-input OR gate 37, causing its output to also be a binary "1."

When three "0's" are detected, the output of OR gate 32 is a "0" which is supplied as one input to two-input NOR gate 36. The other input of NOR gate is supplied by the output of store and delay circuit 34 which is also a "0" when a sequence of three binary "0's" is applied by coder 15. A concurrence of binary "0's" at the input to NOR gate 36 will cause a "1" to appear at its output and be supplied to OR gate 37. Therefore, when a sequence of three "1's" is detected, the output of OR gate 37 will be a "1," indicating this condition. But when these sequences fail to be produced by coder 15, the output of OR gate 37 will be a "0."

The output of OR gate 37 is applied to one input of three-input AND gate 38. A second input to three-input AND gate 38 is supplied by clock source 39 which supplies pulses at the accelerated rate. The output of AND gate 38 is applied as one input to two-input OR gate 300, the other input of which is supplied by clock source 11 of FIG. 1 designated 301 in FIG. 3. The output of OR gate 300 is applied to quantizer 14 and sample and hold circuit 10 and to up/down counter 302. Up/down counter 302 is made to count up when receiving the output of OR gate 300 and is a well-known prior-art device which need not be described in detail herein. Clock source 19 of FIG. 1 is used to countdown up/down counter 302 and is supplied as an input to it. In FIG. 3 clock source 19 is designated with the numeral 303. A lead coming from the output of up/down counter 302 is designated "1" on counter zero and is supplied to one input of three-input OR gate 37. Another lead coming from up/down counter 302 is designated "0" on count of 16 and is supplied as one input to three-input AND gate 38. These leads are shorthand notations of easily derived binary levels depending upon the count in counter 302. Clearly these may be derived by combining the outputs of the stages in the counter to derive the "1" or "0" at the desired count.

When a "1" is produced at the output of OR gate 37 because of the occurrence of three "1's" or three "0's," the accelerated clock rate causes the output of AND gate 38 to produce a pulse train having the frequency of the clock source 39 as long as the count in up/down counter 302 is not 16. This accelerated clock rate is then passed through OR gate 300 to cause up/down counter 302 to count up and is also supplied to quantizer 14 and sample and hold circuit 10 of FIG. 1 to increase the quantizing and sample and hold rate. The rate of clock source 39 may be much greater than that of clock 11 and a simultaneous occurrence through OR gate 300 is relatively improbable. In addition, if clock source 11 were to occur simultaneously with the output of AND gate 38 controlled by clock 39, this would be a "don't care" condition since the increased sampling rate is what is desired and it is, in effect, controlling the increased quantizing and sampling rates.

Clock 19 which is used to gate the information out of elastic store 17 in FIG. 1 causes counter 302 to count down. In this manner up/down counter 302 monitors the state of the elastic store by counting up when information is supplied into elastic store 17 and counting down when it is gated out of elastic store 17 by clock source 19. In order to prevent the elastic store from depleting or overflowing, two leads are taken from up/down counter 302 and are used to control the logic operation shown in FIG. 3. As the counter counts down and approaches depletion; that is, reaches a count of "0," a "1" is generated at the output of up/down counter 302 through logic circuitry, not shown herein but referred to above, and is applied as one input to three-input OR gate 37. When this "1" is generated it causes another sample to be applied to quantizer 14 and sample and hold circuit 10 and causes a countup of "1" in up/down counter 302. The one input to three-input OR gate 37 enables one clock pulse from the accelerated clock source 39 to pass through AND gate 38 to OR gate 300 to cause the quantizing and countup by one. When the elastic store is depleting; that is, when the counter reaches a predetermined count; for instance 16, a "0" is generated and applied to AND gate 38 inhibiting further countup pulses from the accelerated clock source 39. Since clock source 19 is faster than clock source 11, the next pulse to be applied to up/down counter 302 will be a pulse source from clock 19 which will cause the counter to count down when the elastic store is no longer in its overflow condition.

The logic circuit shown in FIG. 3 for logic circuit 16 of FIG. 1 may also be used as the logic circuit for FIG. 2 where the input to the logic circuit is from gate 23 rather than from coder 15 and the output of OR gate 300 is applied to gate 23 rather than quantizer 14 and sample and hold circuit 10. The functions to be carried out by the logic circuit 22 are identical to those in the transmitter of FIG. 1 and, essentially, the logic circuitry shown in FIG. 3 may be adapted for use with logic circuit 22 of FIG. 2. The logic circuit shown in FIG. 3, of course, is merely illustrative of one logic circuit which may be utilized to perform the desired functions.

I claim:

1. A differential pulse code modulation decoder for decoding a signal in binary digital form to an electrical signal comprising:
- means including a first timing signal source for applying the digital signal to a converter at a first rate which produces said electrical signal in accordance with said digital signal,
- logic circuit means for sensing when said digital signal contains a predetermined number of the same binary digit sequentially; and
- means including a second timing signal source and responsive to the occurrence of said sensed predetermined number to supply said digital signal to said converter at a second rate.

2. A decoder as set forth in claim 1 comprising further logic circuit means for causing said digital signal to be supplied to said converter at said first rate under control of said first timing signal source when the predetermined number of the same binary digit produced sequentially is broken by a binary digit of the other kind.

3. A decoder as set forth in claim 1 wherein said second timing signal source produces timing signals having a greater rate than the signals produced by said first timing signal source.

4. A coder for coding an electrical signal into a digital form comprising:
- means for applying said electrical signal to a converter,
- a first timing signal source for causing said converter to produce a digital signal at a first rate, said digital signal comprising binary "1's" and "0's" in accordance with said electrical signal, said coder including circuit means for sensing when said converter produces a predetermined number of the same binary digit sequentially, a second timing signal source, and means responsive to the occurrence of said predetermined number of the same binary digit for causing said converter to produce said digital signal under the control of said second timing signal source.

5. A coder as claimed in claim 4 wherein the timing rate of said second timing signal source is greater than said first rate.

6. A coder as claimed in claim 4 and further including logic circuit means responsive to a change in the binary digit output of said converter after the sequential occurrence of said predetermined number of the same binary digit for causing said converter to produce said digital signal under control of said first timing signal source.

7. A decoder comprising;

a first timing signal source producing timing signals at a first rate, gating means receiving a binary digital signal and gating out said binary digital signal at said first rate, logic means connected to receive the digital output of said gating means comprising:

a second timing signal source producing timing signals at a second, greater, rate, means to sense when said gating means produces a predetermined number of the same binary digit sequentially and causing said gating means to gate out said digital signal at said second rate when said predetermined number is sensed, and conversion means connected to the output of said gating means to produce an electrical signal proportional to said digital signal produced by said gating means.

8. A transmission system comprising a coder and a decoder wherein said coder codes a first electrical signal into digital form and comprising:

a first timing signal source for producing timing signals at a first rate, means for applying said first electrical signal to a first converter which produces a digital signal at said first rate, said digital signal comprising binary "1's" and binary "O's" in accordance with said first electrical signal, logic circuit means to sense when said first converter produces a predetermined number of the same binary digit sequentially, a second timing signal source for producing timing signals at a second greater rate, means responsive to the occurrence of said predetermined number of the same binary digit to cause said first converter to produce said digital signal at said second rate, said decoder which decodes the binary digital output of said first converter to a second electrical signal comprising:

a third timing signal source for producing timing signals at said first rate, means for receiving said binary digital output at a third rate and supplying it under control of said third timing signal source to a second converter at said first rate which produces said second electrical signal in accordance with said binary digital output, logic circuit means to sense when said binary digit output contains a predetermined number of the same binary digit sequentially, a fourth timing signal source for producing timing signals at said second rate, and means in said decoder responsive to the occurrence of said sensed predetermined number to supply said binary digit to said second converter at said second rate.

9. A differential coder comprising:

a comparator having a single output and a pair of inputs, means to sample the output of said comparator, a quantizer connected to respond to the sampled output of said comparator and producing its output at a first rate, a coder connected to respond to the output of said quantizer, said coder producing a binary signal comprising "1'a" and "O's,"

a summing device connected to receive the output produced by said quantizer, means to supply a message waveform and the output from said summing device to the respective inputs to said comparator, means to sense when the coder produces a predetermined number of the same binary digit sequentially, and means responsive to the occurrence of said predetermined number of the same binary digit to cause said quantizer to produce its output at a second rate.

10. A differential coder as set forth in claim 9 wherein said second rate is greater than said first rate.

11. A differential coder as set forth in claim 9 wherein the predetermined number of same binary digit produced sequentially is three.

12. A differential coder as set forth in claim 9 wherein the binary digit output of said coder is supplied to an elastic store at said first and second rates and gated out of said elastic store at a third rate.

13. Apparatus as set forth in claim 12 wherein said third rate is greater than said first rate but less than said second rate.

14. A differential coder as set forth in claim 13 further comprising means connected to said quantizer and coder to monitor the condition of said elastic store and prevent it from overflowing or from depleting.

15. A differential coder as set forth in claim 14 wherein said monitoring means comprises:

a counter capable of counting up and counting down, said counter being counted in one direction at said first rate and in the other direction at said second rate, means connected to said counter to detect when said elastic store is full and inhibiting said counter from continuing to count up, and means connected to said counter to detect when said store is almost depleted and inhibiting said counter from continuing to count down.

16. A differential coder as set forth in claim 15 wherein said means to detect when said elastic store is almost depleted causes an additional sample of said comparator and causes said counter to be counted up by one.

17. A transmission system comprising a differential coder and a decoder wherein said differential coder comprises:

a comparator having a single output and a pair of inputs, means to sample the output of said comparator, a quantizer connected to receive the output of said comparator and producing an output at a first rate, a coder connected to said quantizer, said coder producing a binary signal responsive to the output of said quantizer, a summing device connected to receive the output of said quantizer, means to supply a message waveform and the output from said summing device to the respective inputs to said comparator, means to sense when said coder produces a predetermined number of the same binary digit sequentially, means responsive to the occurrence of said predetermined number of the same binary digit to cause said quantizer to produce its output and said coder to produce its binary digital output at a second rate, and said decoder comprising:

gating means receiving said binary digits from said coder at a third rate and gating out said binary digits at said first rate, logic means connected to receive the digital output of said gating means comprising:

means to sense when said gating means produces a predetermined number of the same binary digit sequentially and causing said gating means to gate out said digital signal at said second rate when said predetermined number is sensed, and conversion means connected to the output of said gating means to produce an electrical signal proportional to said digital signal produced by said gating means.

18. A transmission system in accordance with claim 17 wherein the binary digit output of said coder is supplied to a first elastic store in said coder at said first and second rates and gated out of said first elastic store at said third rate, and a second elastic store in said decoder receiving the output of said first elastic store at said third rate and gating out the information in said third rate and gating out the information in said second elastic store at said first rate and at said second gate when said predetermined number of the same binary digit is detected at the output of said gating means.

19. A transmission system in accordance with claim 18 wherein said third rate is greater than said first rate but less than said second rate.

20. A transmission system in accordance with claim 18 and further comprising means connected to said coder to monitor the condition of said first and second elastic stores and prevent them from overflowing or from depleting.

21. A transmission system in accordance with claim 20 wherein said monitoring means comprises:

a counter capable of counting up and counting down, said counter being counted in one direction at said first rate and in the other direction at said second rate, means connected to said counter to detect when said elastic store is full and inhibiting said counter from continuing to count up, and means connected to said counter to detect when said store is almost depleted and inhibiting said counter from continuing to count down.

22. A transmission system in accordance with claim 21 wherein said means to detect when said elastic store is almost depleted causes an additional sample of said comparator and causes said counter to be counted up by one.